Figure 1:
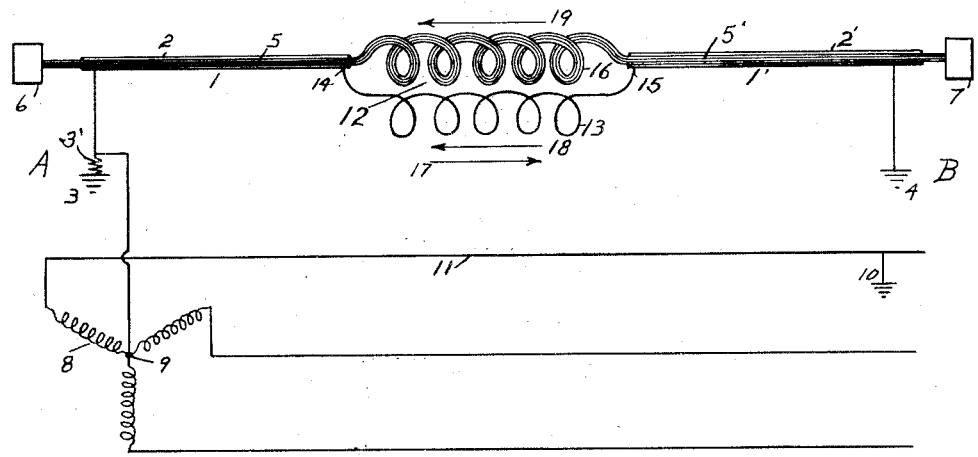

Aug. 19, 1930.   R. W. OSBORNE   1,773,238

PROTECTION OF ELECTRICAL CONDUCTORS FROM EXTRANEOUS ELECTRICAL POTENTIAL

Filed March 15, 1928

Inventor
Ralph W. Osborne
E. W. Bond
Attorney

Patented Aug. 19, 1930

1,773,238

UNITED STATES PATENT OFFICE

RALPH WILLOUGHBY OSBORNE, OF TORONTO, ONTARIO, CANADA

PROTECTION OF ELECTRICAL CONDUCTORS FROM EXTRANEOUS ELECTRICAL POTENTIAL

Application filed March 15, 1928. Serial No. 261,947.

My invention relates to electrical conductors which because of their proximity to other electrical conductors carrying relatively greater power and voltage, are subjected to extraneous transient disturbances causing excessive differences of potential between their extremities. I have special reference to protective means for such electrical conductors when subjected to such transient disturbances.

More particularly my invention refers to electrical conductors in the form of metal sheathed cable used for the communication of intelligence, control circuits and the like between power stations of electric power transmission systems and the protection of such cables from breakdown due to excessive difference of electrical potential between their extremities being set up by transient extraneous disturbances etc.

Although my invention may apply to a group of parallel conductors in any other form, for the purpose of this description and specification, I will show its application to a metal sheathed cable.

If a metal sheathed cable is parallel to an alternating current power line and entirely insulated from ground, the metal sheath and the enclosed wires will have a voltage induced therein, but there will be no difference in potential between the wires and the sheath. It is general practice in cable installations to ground the sheath at intervals and particularly at its extremities, thereby forming a circuit for induced current to flow along the sheath; and the voltage induced in the wires of the cable will be equal to the voltage which causes the induced current to flow along the sheath. In most cases the resultant difference in electrical potential between the sheath and the wires within, at any point, is not of such magnitude as to cause damage to the insulation of the cable.

It has been found however, that low voltage cables such as used for communication and control circuits between power houses of electric power and transmission systems have burned out, and my investigation of the cause of such a burn out in a certain cable indicated that a very heavy current through a power line fault to ground at one of the points where the cable sheath was connected to ground, caused a difference in electrical potential between this ground point and other ground points to which the cable sheath was connected due to the resistance of the ground and the connection thereto. The resultant flow of current along the sheath of the cable from the ground point of high potential to other ground points of lower potential was sufficient to burn out the cable. If the cable sheath and the wires enclosed therein are sufficiently insulated to withstand the voltage to which they are subjected, it is not practical to so insulate apparatus associated with the cable and the apparatus will consequently be damaged.

The object of my invention is to provide means for the protection of a cable or other group of parallel electrical conductors and their associated apparatus from damage caused by induced voltage or difference in the electrical potential of the different ground points to which the cable, conductors or associated apparatus is connected.

In the attainment of this object a multiple winding transformer is provided and a further object of my invention is to provide a multiple winding transformer of simple and cheap construction in which exactly equal electromotive forces are induced in the various windings when the transformer is energized.

Figure 2:
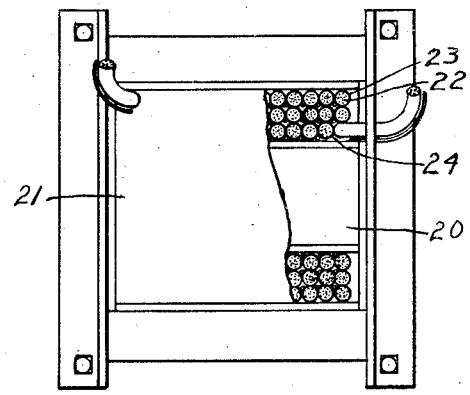

In order to fully understand my invention reference may be had to the following description and accompanying drawings in which Fig. 1 is a diagrammatic view of my invention and Fig. 2 is a detail of a multiple winding transformer which is a part of my invention.

In Fig. 1 are indicated two power houses A and B with a cable 1 and 1' having its metal sheath 2 and 2' connected to ground points 3 and 4 at its extremities and its group of separately insulated conductors 5 and 5' connected at either end to apparatus 6 and 7. As a source of extraneous current a power system is indicated having a winding 8 with a neutral point 9 connected to ground point 3, in which a fault to ground has occurred at 10 on one of its line conductors 11 through which a heavy fault current flows from winding 8 through line conductor 11 ground fault 10 ground point 3 to neutral point 9. Due to the resistance of the ground and ground connections ground point 3 has an appreciable resistance 3' and the heavy fault current feeding through the ground resistance 3' causes a difference in potential between the ground point 3 and ground point 4, which expressed in volts, is equal to the product of the fault current in amperes and the resistance 3' of the ground point 3 in ohms. Unless means are provided to prevent it, a large part of the fault current will pass over to the ground point 4 and flow along the cable sheath to ground 3 or vice versa depending on the instantaneous direction of the alternating current, and burn out the cable. In order to prevent this I provide a transformer 12 having a group of windings or multiple windings in which 13 is the primary winding of the group connected in series relation with the sheath 2 and 2' at 14 and 15. (In practice primary winding 13 is wound simultaneously with secondary winding 16, but for convenience in describing the functions of this device, the primary and secondary windings are shown separately.) 16 is the secondary winding of the group comprising a number of wires equal to the number of conductors in the cable and connected respectively in series relation with the conductors of the cable.

The difference in potential between ground points 3 and 4 is impressed on the primary winding 13 from ground point 3, through cable sheath 2, transformer connecting point 14, winding 13, connecting point 15, cable sheath 2', and ground point 4. If the direction of the potential impressed on the transformer primary winding 13 is in the direction as indicated by the arrow 17 the transformer will build up a counter-electromotive force in the direction as indicated by the arrow 18 and an equal electromotive force in the same direction in the secondary windings 16 as indicated by the arrow 19. It will be seen from the foregoing that the counter-electromotive force set up in the primary winding 13 as indicated by the arrow 18 is equal to and in the same direction as the electromotive force set up in the secondary winding 16 as indicated by the arrow 19 and that therefore there will be no appreciable difference in potential between points of like polarity in the primary and secondary windings and likewise no appreciable difference in potential between the conductors and the sheath of the cable. It is also evident that the current along the sheath 2 and 2' and in the primary winding 13 will be the exciting current of the transformer.

The transformer must be so designed that there will be practically no magnetic leakage between the primary winding and the secondary winding and so that precisely equal electromotive forces will be generated in the several separately insulated conductors of the secondary winding when the primary winding is energized. The attainment of these characteristics which is one of the objects of my invention is secured by the very simple expedient of constructing the windings of a cable of separately insulated wires. The cable is wound in a coil about a core of magnetic material in the same manner as if it were one large wire, and being of a standard type as purchased in the open market, the wires are stranded together in pairs and the whole built up together to obtain a perfect balance between the various wires and pairs; and therefore when the completed winding is acted upon by the magnetic field of its associated magnetic core, precisely equal electromotive forces are generated in the various wires comprising the winding.

Fig. 2 is a detail showing clearly how the transformer is constructed. 20 is the magnetic core of the transformer, 21 the windings constructed of several turns of cable 23 comprising several separately insulated wires 22. One or more of the wires in the cable winding may be made to function as the primary winding 13, Fig. 1 while the remainder of the wires function as the secondary winding 16, Fig. 1; but it will be noted that there is considerable space between the adjacent turns of the cable and in practice I utilize this otherwise waste space by winding a separate wire 24 in the spaces between the adjacent turns, the said wire forming the primary winding. Because of the distribution of the primary winding throughout the interior of the secondary winding, magnetic leakage between the primary and secondary wires is practically nil.

While I have shown and described one embodiment of my invention, it will be understood that various modifications may be made without departing from the spirit and scope of the appended claims.

What I claim is:

1. The combination with a group of parallel electrical conductors subjected to a difference of extraneous electrical potential between the extremities of the said group, the extremities of one part of the said group being grounded, the extremities of the remaining part being ungrounded, of a transformer comprising multiple windings constructed of a group of separately insulated wires formed into a cable, said cable being wound around a magnetic core to form said windings, the wires of said windings being connected respectively in series relation with the component parts of said group of parallel electrical conductors.

2. The combination with a cable comprising a plurality of electrical conductors, the extremities of said cable being subjected to a difference of extraneous electrical potential, the extremities of one part of the said cable being connected to ground, the extremities of the remaining part being ungrounded, of a transformer comprising multiple windings constructed of a group of separately insulated wires formed into a cable, said cable being wound around a magnetic core to form the said windings, the wires of said windings being connected respectively in series relation with the component parts of the said cable comprising the plurality of electrical conductors.

3. The combination with a cable comprising a plurality of electrical conductors enclosed in a metal sheath, the extremities of said cable being subjected to a difference of extraneous electrical potential, the extremities of the said sheath being connected to ground, the extremities of the said plurality of electrical conductors being ungrounded, of a transformer comprising multiple windings constructed of a group of separately insulated wires formed into a cable, said cable being wound around a magnetic core to form the said windings, one wire of said windings being connected in series relation with the said metal sheath, the remaining wires being connected respectively in series relation with the conductors of the said cable comprising the plurality of electrical conductors enclosed in the metal sheath.

4. The combination with a cable comprising a plurality of electrical conductors enclosed in a metal sheath, the extremities of said cable being subjected to a difference of extraneous electrical potential, the extremities of the said sheath being connected to ground, the extremities of the said plurality of electrical conductors being ungrounded, of a transformer comprising multiple windings constructed of a group of separately insulated wires formed into a cable, said cable being wound around a magnetic core to form the said windings, one wire of said windings being connected in series relation with the said metal sheath, to function as the primary windings, the remaining wires being connected respectively in series relation with the conductors of the said cable comprising the plurality of electrical conductors enclosed in the metal sheath, to function as the secondary windings.

In testimony whereof I affix my signature this ninth day of March at the city of Toronto.

RALPH WILLOUGHBY OSBORNE.